Jan. 10, 1933. W. C. McWHIRTER 1,893,824
AUTOMATIC CROSSING GATE
Filed May 12, 1932   3 Sheets-Sheet 1
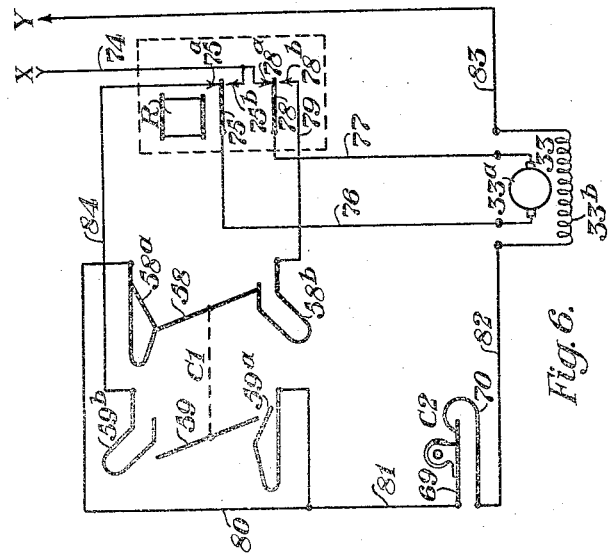
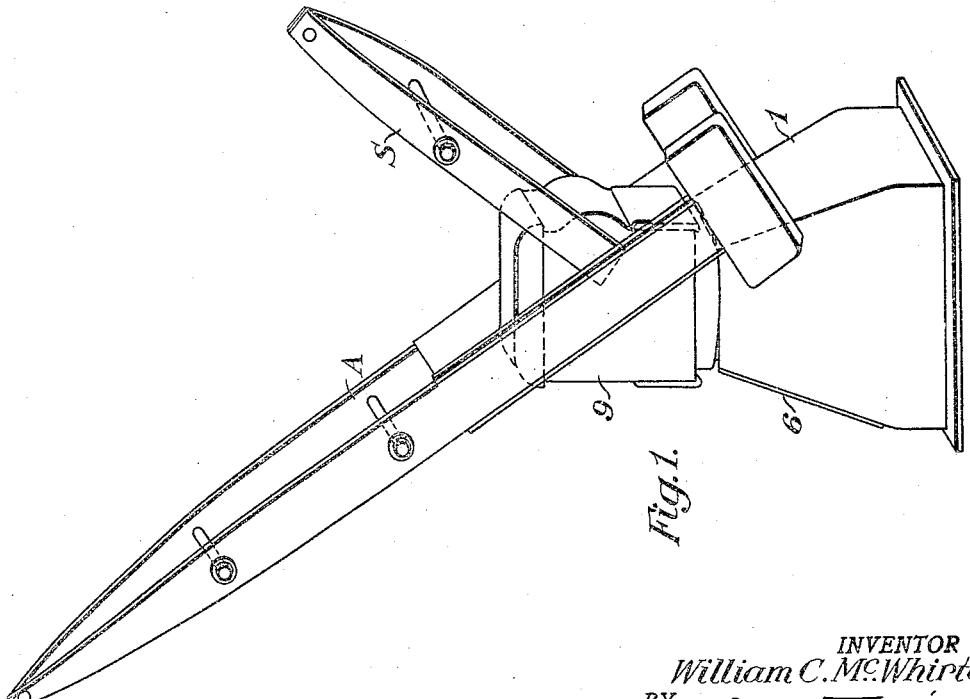
INVENTOR
*William C. McWhirter.*
BY
HIS ATTORNEY Patented Jan. 10, 1933

1,893,824

UNITED STATES PATENT OFFICE

WILLIAM C. McWHIRTER, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

AUTOMATIC CROSSING GATE

Application filed May 12, 1932. Serial No. 610,831.

My invention relates to automatic crossing gates, that is, to gates adapted to be located adjacent the intersections of highways and railways for preventing users of the highway from crossing the railway when a train is approaching the intersection.

One object of my invention is to provide a gate which will be positive in operation under normal conditions, but which will be stopped without damage to a vehicle or to the gate in case the descent of the gate to its effective position is interfered with by the vehicle.

I will describe one form of gate embodying my invention, and will then point out the novel features thereof in claims.

Figure 2:
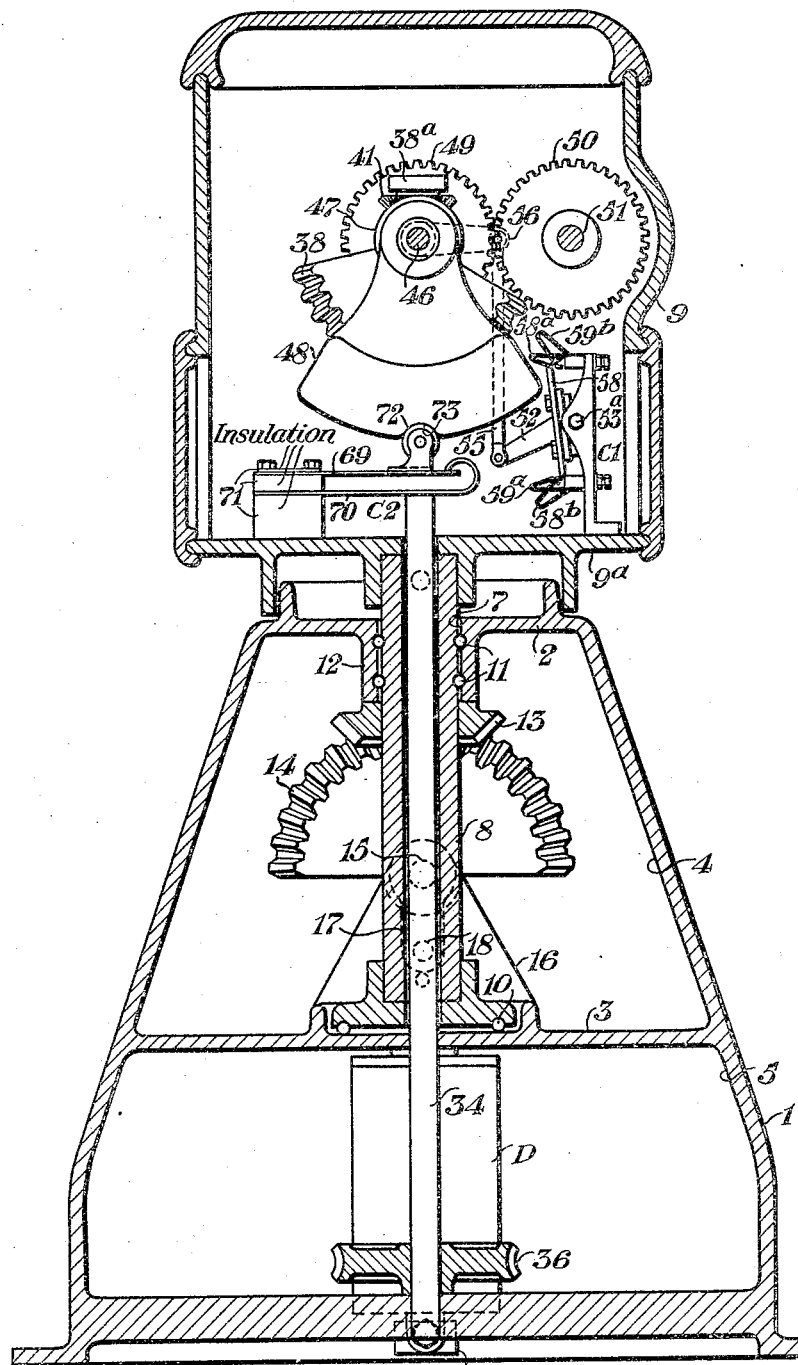
Figures 3, 4, 5:
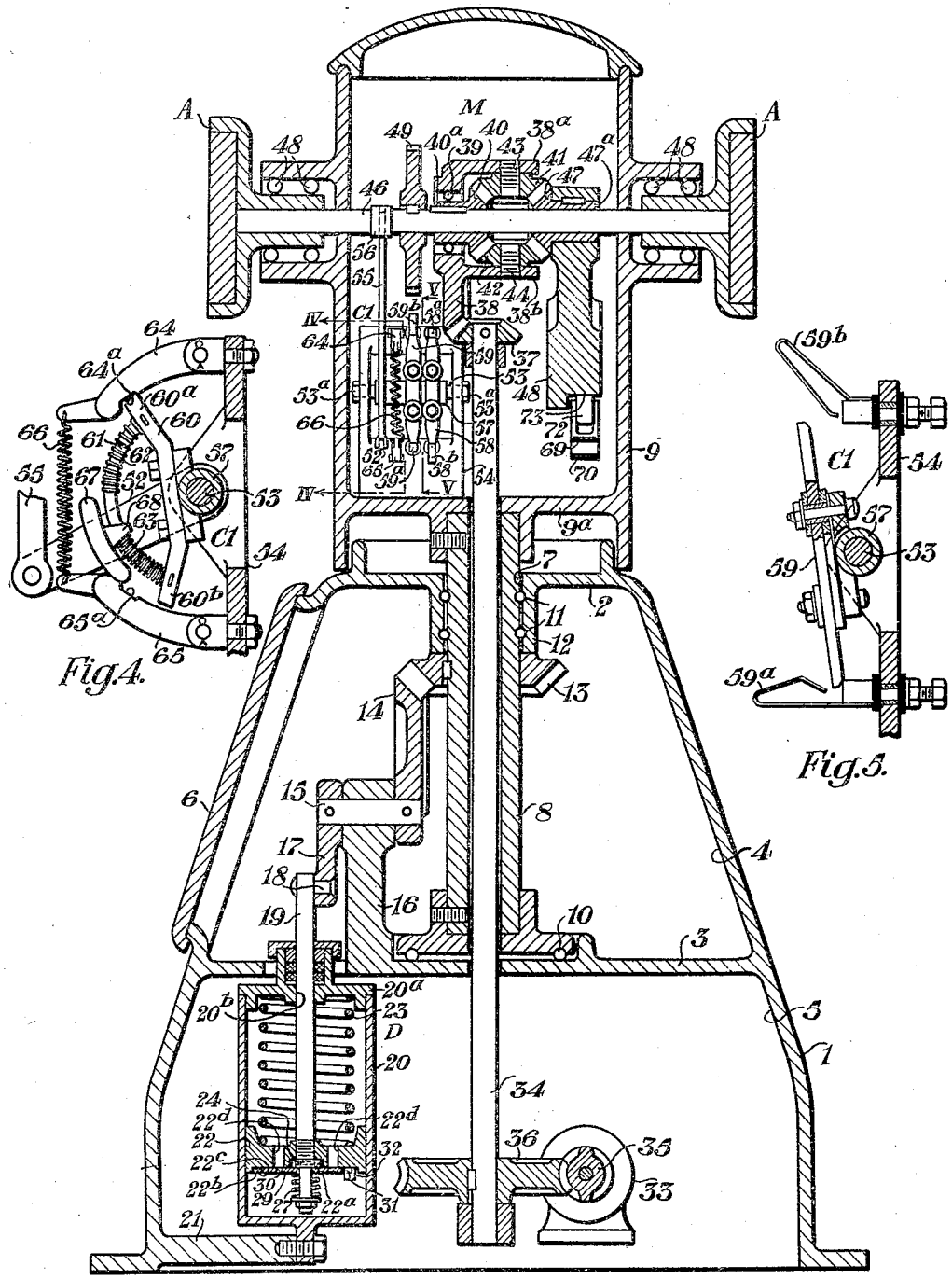

In the accompanying drawings, Fig. 1 is an isometric view showing one form of gate embodying my invention. Fig. 2 is an enlarged vertical sectional view of the gate shown in Fig. 1. Fig. 3 is a sectional view of the gate shown in the preceding views taken at right angles to Fig. 2, and drawn to the same scale as Fig. 2. Figs. 4 and 5 are enlarged sectional views taken on the lines IV—IV and V—V, respectively, of Fig. 3. Fig. 6 is a diagrammatic view showing the operating circuits for the gate shown in Fig. 1.

Similar reference characters refer to similar parts in each of the several views.

Referring first to Figs. 1, 2 and 3, a crossing gate constructed in accordance with my invention is here shown as comprising a base 1, partially closed at its upper end by an integral top wall 2, and formed with an intermediate partition 3 which divides the base into an upper compartment 4 and a lower compartment 5, convenient access to the upper compartment 4 being permitted by a suitable removable cover plate 6. Extending into the upper compartment 4 through a centrally located opening 7 in the top wall 2 is a vertically disposed tubular upright 8 which serves as a support for a transmission housing 9. For reasons which will be made clear hereinafter, it is desirable that the transmission housing 9 should be free to rotate with respect to the base 1, and in order to permit the desired rotation, the upright 8 is supported on anti-friction bearings 10 located in a suitable bearing race formed on the upper side of the partition 3, and anti-friction bearings 11 are also interposed between the side of the upright adjacent its upper end and a bearing guide 12 which extends downwardly from the top plate 2.

Fixed to the upright 8 directly below the bearing guide 12 is a bevel pinion 13 which meshes with a bevel segment 14 pinned to one end of a short shaft 15. The short shaft 15 is journalled in, and extends through, an upright arm 16 attached to the partition 3, and the free end of the shaft is fixed to a crank 17 which is provided with a crank pin 18. The crank pin 18 is operatively connected with a piston rod 19 forming part of a suitable device D for biasing the upright 8, and hence the transmission housing 9, to a predetermined position relative to the base 1.

The biasing device D may have any preferred construction, and in the form illustrated, comprises a cup-shaped cylinder 20, closed at its upper end by a cylinder head $20^a$, and pivotally attached at its lower end to a lug 21 formed on the side wall of the base 1, in such manner that the cylinder is free to rock in a plane which is parallel to the plane of rotation of the crank 17. The piston rod 19 extends into the cylinder 20 through a suitable hole $20^b$ in the cylinder head $20^a$, and is attached, at its inner end, to a reciprocable piston 22 by means of a nut 24. The nut 24 is located wholly within a circular recess $22^a$ formed in the lower side of the piston 22 to prevent it from interfering with the operation of a valve 29 to be described hereinafter. The piston 22 is biased by means of a spring 23 to the position in which it is illustrated in the drawings, and is provided with a second circular recess $22^b$ and with a plurality of holes $22^d$. The holes $22^d$ are arranged in a circle about the piston and communicate with the recess $22^b$ for at times permitting the passage of fluid through the piston, as will be explained more fully hereinafter. The side of the recess $22^b$ adjacent the holes $22^d$ is finished to form a valve seat $22^c$ against which the valve 29 referred to hereinbefore is constantly urged by means of a coil spring 27. Formed in the valve 29 is a restricted opening 30 which is adapted to align with one of the holes 24 in the piston 22. The valve 29 is also provided with a slot 31 in one side which cooperates with a pin 32 carried by the piston 22, to hold the valve in the desired angular position relative to the piston. The cylinder 20 is intended to be filled with a suitable fluid, such as oil, and it will be readily seen that if the piston 22 is forced upwardly, the pressure of the fluid on the upper side of the piston will open valve 29, thus permitting the fluid to flow freely through the holes 22$^d$ in the piston 22 into the cylinder on the lower side of the piston. The pressure exerted on the valve 29 by the spring 27 is comparatively small, so that very little pressure is required to open this valve, and it follows that the resistance of the piston to upward movement is only slightly greater than that required to compress spring 23. When, however, the piston is moved downwardly, the spring 27 holds valve 29 closed, and the fluid on the lower side of the piston is then forced to flow through the restricted opening 30 in this valve. The rate at which fluid can flow through the restricted opening 30 is relatively slow, and it follows that under these latter conditions, the piston will be constrained to move at a relatively slow rate.

Also mounted in the lower compartment 5 of the base 1 is a reversible motor 33 which drives a vertical shaft 34. As here shown, the motor 33 is operatively connected with the shaft 34 by means of a worm 35 fixed to the motor shaft and engaging a worm wheel 36 pinned to the vertical shaft 34. The shaft 34 extends upwardly with some clearance through the partition 3, the tubular upright 8, and the lower wall 9$^a$ of the transmission housing 9, and is provided at its upper end with a bevel pinion 37. The bevel pinion 37 drives, through the medium of differential mechanism M constructed and arranged in accordance with my present invention, a horizontal shaft 46 to which the main crossing arm A is attached. It will be noted that the weight of the main crossing arm A and shaft 46 is carried by anti-friction bearings 48 mounted in the side of the transmission housing 9, so that a minimum amount of torque is required to drive the shaft 46 in order to raise and lower the crossing arm A.

The differential mechanism M, which is most clearly illustrated in Fig. 3, comprises, in the form here shown, a gear segment 38 journalled by means of anti-friction bearings 39 on the hub 40$^a$ of a bevel gear 40 which is keyed to the shaft 46. The gear segment 38 meshes with the bevel pinion 37, and is provided with two spaced arms 38$^a$ and 38$^b$ which are located on opposite sides of, and which extend parallel with, the shaft 46. The arms 38$^a$ and 38$^b$ carry two pins 43 and 44, respectively, and rotatably mounted on these pins are two bevel pinions 41 and 42, each of which meshes with the bevel gear 40 and with another bevel gear 47 which is rotatably mounted on the shaft 46. Rotation of the bevel gear 47 in response to rotation of the segment 38 is opposed by the bias of a counterweight 48 fixed to the hub 47$^a$ of the bevel gear 47, as will be explained more fully hereinafter.

Also fixed to the shaft 46 is a spur gear 49 which meshes with a similar gear 50 mounted on an auxiliary shaft 51. The auxiliary shaft 51 operates a sidewalk arm S which is rotatably mounted in the transmission housing 9 in the same manner as the main crossing arm A is rotatably mounted in the transmission housing 9. It will be readily understood, therefore, that rotation of the shaft 46 will not only raise or lower the main crossing arm, depending upon the direction of such rotation, but will also similarly raise or lower the sidewalk arm.

Motor 33 which, as shown in Fig. 6, is of the series type, is controlled in part by a circuit controller C1 operated by the shaft 46. The circuit controller C1 may be of any suitable construction, and in the well known form here shown comprises a rocker sleeve 57 journalled for rotation between two extreme positions on a horizontal shaft 53 which, in turn, is pivotally supported in suitable trunnion screws 53$^a$ carried by a bracket 54 mounted on the bottom wall 9$^a$ of the transmission housing 9. The rocket sleeve 57 carries two contact fingers 58 and 59. The contact fingers 58 and 59 are insulated from the rocker sleeve, and are adapted to cooperate with fixed contact members 58$^a$, 58$^b$, and 59$^a$, 59$^b$, respectively, to close a contact 58$^a$—58—58$^b$ or 59$^a$—59—59$^b$ according as the rocker sleeve occupies the extreme position in which it is shown in the drawings, or its opposite extreme position. The fixed contact members 58$^a$, 58$^b$ and 59$^a$, 59$^b$ are secured to suitable binding posts insulatingly mounted in the bracket 54. The rocker sleeve 57 also carries a latching arm 60 (see Fig. 4), the extremities 60$^a$ and 60$^b$ of which cooperate with suitable means for locking the sleeve in one extreme position or the other. As here shown, these means comprise two dogs or pawls 64 and 65, pivotally supported on the bracket 54, and so disposed with respect to the latching arm 60, as to permit of its extremities moving between and adjacent the inner faces thereof. The dogs are provided, as shown, with recesses 64$^a$ and 65$^a$, adapted to receive the extremities 60$^a$ or 60$^b$ of the latching arm 60 according as the rocker sleeve occupies the extreme position shown, or its opposite extreme position. In order to insure the engagement of the dogs with the extremities of the latching arm, and in order to positively keep the latching arm locked within one or the other of the recesses 64$^a$ or 64$^b$, the free ends of the dog are connected with the opposite ends of a tension spring 66 which draws them together with sufficient pressure to effect the desired positive engagement of the extremities of the arm with the dogs. Attached to the arm 60 is a curved rod 61, and mounted on this rod are two coil springs 62 and 63. The coil springs 62 and 63 are adapted to be alternately put under compression prior to releasing the arm 60 from the latching means, in such manner that, when the arm 60 is released, the arm will move from the extreme position which it then occupies to its opposite extreme position with a snap action. As here shown, the means for alternately placing the springs 62 and 63 under compression comprises a rocker arm 52 which is loosely journalled at one end on the shaft 53 at one side of the latching arm 60, and which is adapted to be rotated between the extreme position shown and an upper extreme position spaced approximately 60° from the extreme position shown in a clockwise direction. The arm 60 carries a releasing member 67 which moves in the same, or approximately the same, circumferential plane in which the locking dogs are located, and which is adapted to lift the locking dogs out of contact with the extremities of the latching arm so as to permit the rocker sleeve 57 to be rocked by the springs 62 and 63. Secured to the releasing member 67 is a lug 68 which surrounds the rod 61 between the confronting ends of the springs 62 and 63. It will be evident that upon movement of the rocker arm 52, the lug 68 will travel back and forth on the rod 61 between the locking dogs 64 and 65 to compress the springs 62 and 63. The free end of the rocker arm 52 is connected to the lower end of a link 55, the upper end of which is pivotally connected to an arm 56 secured to the shaft 46 (see Fig. 2). The parts are so proportioned that when the shaft 46 is rotated in a manner to lower the crossing and sidewalk arms from their upper or ineffective positions in which they are shown in the drawings to their lower or effective positions, the rocker arm 52 will be rotated from the extreme position shown to its upper extreme position.

The operation of circuit controller C1 is as follows: As shown in the drawings, the rocker arm 52 occupies its lowermost position, and the rocker sleeve 57 is rotated to its extreme position in a counter-clockwise direction. Under these conditions, the dog 64 engages the extremity 60$^a$ of the latching arm 60 in a manner to prevent clockwise rotation of the arm and the dog 65 is held out of engagement with the extremity 60$^b$ by the releasing member 67. Spring 63 is partly compressed, but spring 62 is unstressed. Contact 58$^a$—58—58$^b$ is closed, and contact 59$^a$—59—59$^b$ is open.

I will now assume that rocker arm 52 is rotated from the extreme position shown to its opposite extreme position. The first part of this rotation moves the releasing member 67 out of engagement with the dog 65 and the lug 68 out of engagement with the spring 63, and as this rotation continues, the lug 68 moves into engagement with the spring 62 and starts to compress this spring. When the rocker arm 52 nears the upper end of its stroke, the releasing member 67 lifts the dog 64 out of engagement with the extremity 60$^a$ of the latching arm 60, and permits the then completely compressed spring 62 to drive the rocker sleeve 57 in a clockwise direction to the opposite extreme position from that in which it is shown in the drawings, with a snap action. When the rocker sleeve 57 reaches its opposite extreme position, the tension spring 66 draws the locking dog 65 inwardly to the position in which the extremity 60$^b$ of the latching arm 60 enters the recess 65$^a$ in the dog, thus locking the rocker sleeve against counter-clockwise rotation in its new position. The reversal of the rocker sleeve, of course, opens contact 58$^a$—58—58$^b$ and closes contact 59$^a$—59—59$^b$. When the rocker arm 52 is next restored to the position shown, the operation of the circuit controller C1 is just the reverse of that described above and will be readily understood from an inspection of the drawings without describing it in further detail.

Motor 33 is also controlled, in part, by a circuit controller C2 here shown as comprising a relatively flexible contact finger 69 and a relatively rigid contact finger 70 clamped at one end in parallel spaced relation between insulating blocks 71 secured to the bottom wall 9$^a$ of the transmission housing 9. Attached to the flexible contact finger 69 is a roller 72 which is adapted to enter a recess 73 in the counterweight 48 when and only when the counterweight occupies its normal position in which it is illustrated in the drawings. The parts are so proportioned that when the roller 72 is within the recess 73, the finger 69 will be held by an initial tension in the position in which it engages the finger 70, thus closing the contact 69—70, but that if the roller is forced out of the recess 73 in the counterweight 48 for any reason, the finger 69 will be moved downwardly in a manner to open contact 69—70.

Referring now to the wiring diagram for the signal shown in Fig. 6, it will be seen that motor 33 is also controlled by a relay R which is part of the trackway apparatus, and which is adapted to be energized at all times except when a train is approaching the crossing adjacent which the crossing gate is located.

As shown in the drawings, the arms A and S of the crossing gate are in their raised or ineffective positions. Contacts 58$^a$—58—58$^b$ of circuit controller C1 and contact 69—70 of circuit controller C2 are closed, but contact 59ª—59—59ᵇ of circuit controller C1 is open. Relay R is energized, and motor 33 is deenergized.

I will now assume that with the parts in the positions just described, relay R becomes deenergized. When this happens, a circuit is completed for motor 33, and current flows from terminal X of a suitable source not shown in the drawings, through wire 74, back contact 75—75ᵇ of relay R, wire 76, armature 33ª of motor 33, wire 77, back contact 78—78ᵇ of relay R, wire 79, contact 58ª—58—58ᵇ of circuit controller C1, wires 80 and 81, contact 69—70 of circuit controller C2, wire 82, field winding 33ᵇ of motor 33, and wire 83 back to terminal Y of the source. The current supplied to motor 33 over the circuit just traced energizes the motor in a manner to cause it to rotate the shaft 34 in a counter-clockwise direction as viewed from above, thus rotating the gear segment 38 in a counter-clockwise direction as viewed in Fig. 2. This counter-clockwise rotation of the gear segment 38, in turn, transmits, through the bevel pinions 41 and 42 a force which tends to rotate the bevel gears 40 and 47 in the same direction. As pointed out hereinbefore, however, the counterweight 48 opposes rotation of the bevel gear 47, and the parts are so proportioned that, under normal operating conditions, the counterweight will absolutely prevent rotation of the bevel gear 47. It follows, therefore, that normally only the bevel gear 40 of the differential mechanism will be rotated in response to rotation of the shaft 34. Since the bevel gear 40 is keyed to the shaft 46, the rotation of this bevel gear will, of course, rotate the shaft 46 which, in turn, lowers both the main crossing arm A and sidewalk arm S. When the arms A and S reach their lowermost positions, circuit controller C1 operates to open its contact 58ª—58—58ᵇ and to close its contact 59ª—59—59ᵇ. The opening of contact 58ª—58—58ᵇ interrupts the circuit which was previously closed for motor 33 at this contact, and motor 33 therefore becomes deenergized, thus preventing further operation of the parts under these conditions.

I will next assume that with the arms A and S of the crossing gate in their lowermost positions, relay R again becomes energized. Under these conditions, another circuit is completed for motor M, and current flows from terminal X, through wire 74, front contact 78—78ª of relay R, wire 77, armature 33ª of motor 33, wire 76, front contact 75—75ª of relay R, wire 84, contact 59ᵇ—59—59ª of circuit controller C1, wire 81, contact 69—70 of circuit controller C2, wire 82, field winding 33ᵇ of motor 33, and wire 83 to terminal Y. It will be observed that the current supplied over the circuit just traced traverses the field winding 33ᵇ of motor 33 in the same direction as it did when the arms A and S of the crossing gate were being lowered, but that, the direction of the current through the armature 33ª is reversed. The motor 33, therefore, now rotates the shaft 34 in the opposite direction from that which it rotated the shaft during the lowering of the gate arms, and as a result, the gate arms are now raised, the operation of the parts under these conditions being apparent from the foregoing and from an inspection of the drawings. When the arms reach their uppermost positions, contact 59ᵇ—59—59ª of circuit controller C1 opens, and contact 58ª—58—58ᵇ again becomes closed. The opening of contact 59ᵇ—59—59ª deenergizes motor 33, and the parts are then restored to their normal conditions in which they are shown in the drawings.

I will now assume that the movement of the gate arms is interfered with, during their downward travel, by an object such as a vehicle. As soon as a sufficient force is exerted on the gate arms, the gate arms will cease to move, and the bevel gear 47 will then start to rotate and rotate the counterweight 48. A slight displacement of counterweight 48 from its normal position will operate circuit controller C2 to open contact 69—70, and when contact 69—70 becomes opened motor 33 will become deenergized, thus stopping the parts in the positions which they then occupy. It will be readily understood that the force which must be exerted on the gate arms necessary to cause the counterweight 48 to rotate depends upon the proportioning of the parts, and hence may be definitely controlled. It follows, therefore, that by properly proportioning the parts, the gate arms may be made to stop their downward movement upon a slight impact at the point of obstruction, thus preventing damage to the vehicle or to the gate or to both.

It should be pointed out that, since counterweight 48 may be made to act in either direction, any obstruction tending to prevent upward movement of the gate arms will likewise open contact 69—70 and hence prevent damage to the gate under these conditions.

In case the gate arms are in their lower or effective positions so as to obstruct traffic in the usual manner, and the gate arm A is struck in a horizontal direction, the transmission housing 9 will rotate about the base 1. This rotation will act through the bevel pinion 13, bevel segment 14, shaft 15, crank 17, and piston rod 19 of biasing device D to raise the piston 22 of biasing device D, thus compressing spring 23 of this biasing device. As a result, as soon as the obstruction is removed, the spring 23 will act to return the transmission housing 9 to its normal position relative to the base 1, the rate of movement of the housing under these conditions being constrained to the slow rate at which the fluid in cylinder 20 can flow through the opening 30 in the valve 29 as previously described, thus eliminating the possibility of damage to the vehicle or the gate under these conditions.

It should be pointed out that while I have shown the driving gear 47 of the differential mechanism M biased to one position by the counterweight 48, a spring or any other suitable form of biasing means may be substituted for this counterweight without departing from my invention.

It should also be pointed out that while the mechanism as above described is adapted particularly for operating gates, the arms of which normally move in a vertical plane by a suitable change in the angle of application of the driving parts, the differential principle of operating the arms can be equally well applied to a gate whose arms normally move in a horizontal plane. A gate whose arms normally move in a horizontal plane would not require the centering and biasing device D, and since the arms would be moved toward and away from their effective position by motor power, any obstruction to the moving gate would, through the differential action, displace the counterweight 48 sufficiently to cut off the power to the motor, and thus stop the movement of the gate. In case of a force applied to move the gate from any position, or to reverse it in its direction of travel, the counterweight would rotate and prevent damage to the mechanism, and at the same time, tend to minimize damage to the colliding object.

Although I have herein shown and described only one form of automatic crossing gate embodying my invention, it is understood that various changes and modifications may be made therein within the scope of the appended claims without departing from the spirit and scope of my invention.

Having thus described my invention, what I claim is:

1. A crossing gate comprising a rotatable shaft, a crossing arm operatively connected with said shaft, a first gear wheel keyed to said shaft, a second gear wheel rotatably mounted on said shaft, a counterweight secured to said second gear wheel for biasing said second gear wheel to one position, said counterweight being provided with a recess, means including an electric motor for rotating one or the other of said gear wheels depending upon which gear wheel offers the least resistance to its rotation, a circuit controller comprising a relatively flexible contact finger biased into engagement with a relatively rigid contact finger, a roller secured to said flexible contact finger and cooperating with the recess in said counterweight in such manner that the roller will enter said recess and permit the contact formed by said two contact fingers to become closed when and only when said gear wheel occupies the position to which it is biased by said counterweight, and a circuit for said motor including said contact.

2. A crossing gate comprising an upright member rotatable about a vertical axis, a crossing arm supported by said member in such manner that rotation of said crossing arm in a horizontal plane will cause corresponding rotation of said member, a bevel pinion secured to said member, a rotatable shaft, a bevel segment secured to said shaft and meshing with said pinion, a crank secured to said shaft and provided with a crank pin, a buffing device comprising a cylinder pivotally mounted at one end, a reciprocable piston extending into the other end of said cylinder and having its outer end operatively connected with said crank pin, a piston in said cylinder attached to the inner end of said piston rod, a spring interposed between said piston and said other end of said cylinder for biasing said piston to one position in said cylinder, and means for permitting free relative movement of said piston and said cylinder when said piston is moved in the direction to compress said spring and for retarding relative movement of said piston and said cylinder when said piston is moved in the opposite direction.

In testimony whereof I affix my signature.

WILLIAM C. McWHIRTER.